March 2, 1954  C. I. LEVEKE  2,670,996
ENDLESS TREAD
Filed Oct. 20, 1951  2 Sheets-Sheet 1
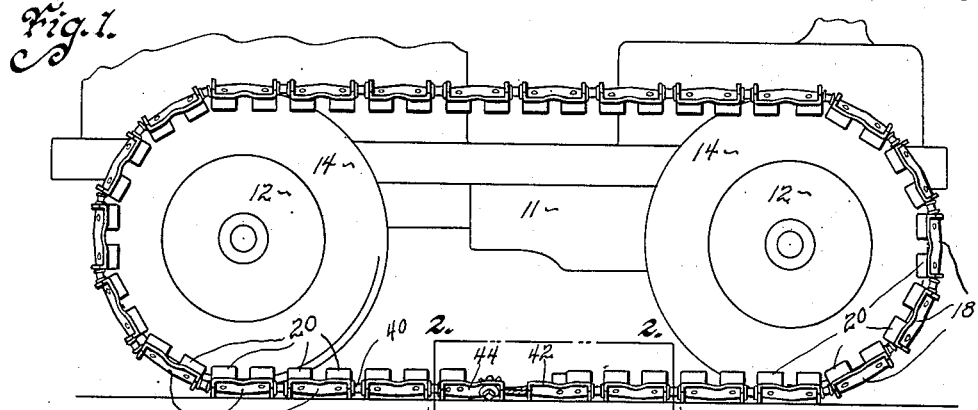
Fig. 1.
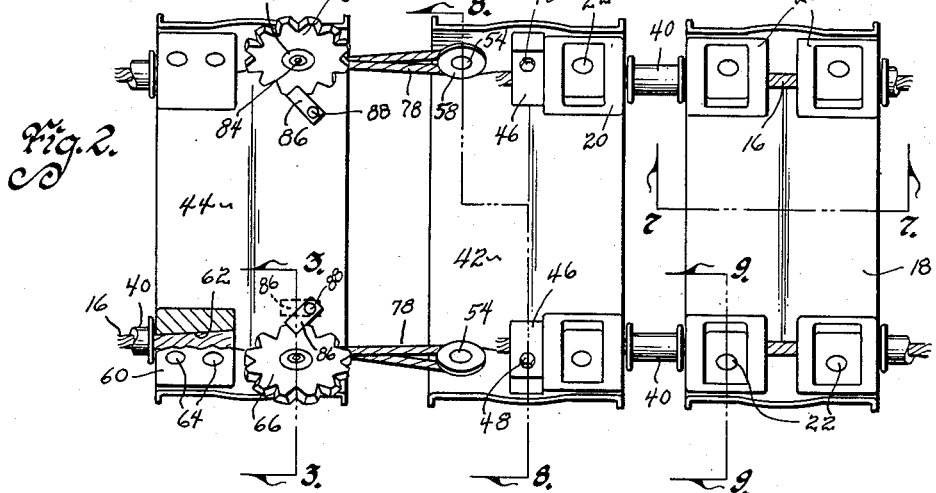
Fig. 2.
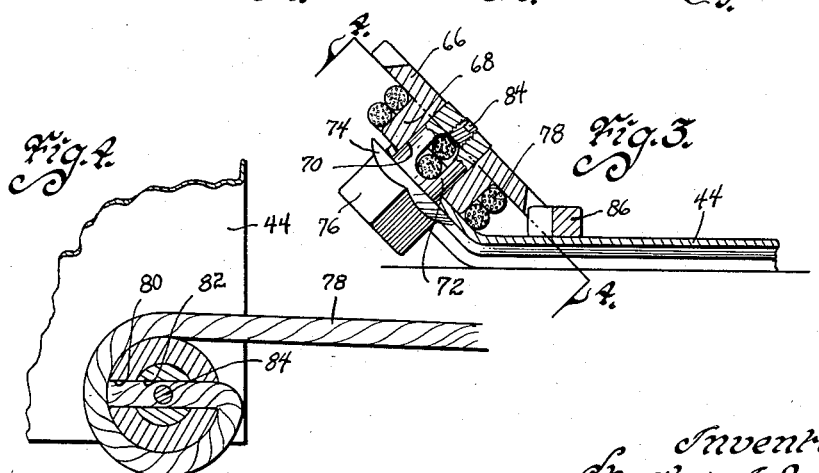
Fig. 3.
Fig. 4.
Witness
Edward P. Seeley
Inventor
Chester I. Leveke
by M. Talbert Dick
Attorney March 2, 1954 C. I. LEVEKE 2,670,996
ENDLESS TREAD
Filed Oct. 20, 1951 2 Sheets-Sheet 2
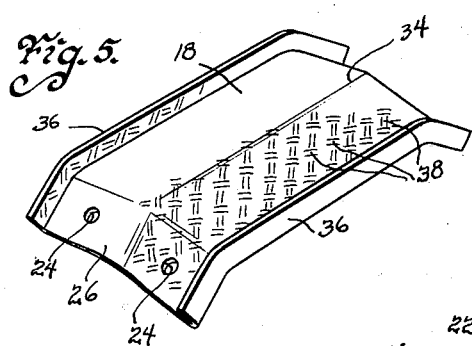
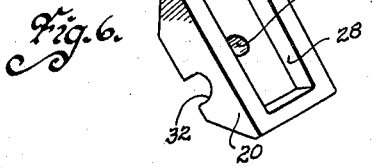
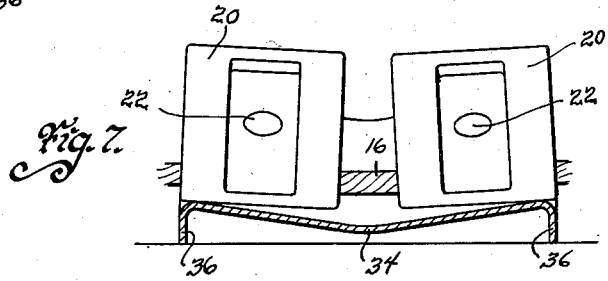
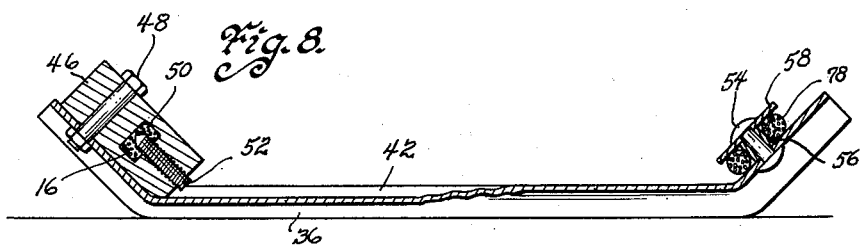
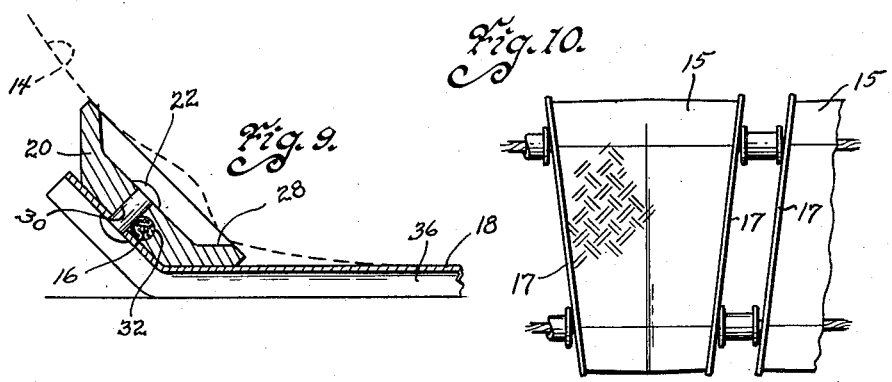
Inventor
Chester I. Leveke
by M. Talbert Dick
Attorney
Witness
Edward P. Seeley Patented Mar. 2, 1954

2,670,996

UNITED STATES PATENT OFFICE 2,670,996

ENDLESS TREAD

Chester I. Leveke, Des Moines, Iowa

Application October 20, 1951, Serial No. 252,252

3 Claims. (Cl. 305—10)

My invention is a new form of detachable endless tread for temporarily converting resiliently tired vehicles into the crawling or endless tread type. Specifically my new endless tread is characterized in part by a new pad structure that is exceptionally strong, tough, light and economical. It is further characterized by a novel tightening and securing means that makes the device easy to assemble on the tractor or the like and equally easy to remove when it is desired to have a regular rubber tired vehicle again.

There are many small enterprises that can well use both the crawling endless tread type of draft vehicle and also a rubber pneumatic tired type. The small contractor, the small orchard man, and almost every farmer has occasion to need each of these two types of draft prime movers at some time. On the other hand, the value of having these two type of tractors may not be great enough to warrant purchasing separate units. The farmer may have a particularly damp spring when it is important for him to have the crawling type tractor for plowing or cultivating. Such weather does not occur regularly, of course, and one or two occurrences would not warrant the payment of thousands of dollars for a separate endless tread tractor. Much of the time a rubber tired vehicle is as valuable in the fields and preferable on the highway. When the weather is adverse to using normal farm draft vehicles, however, the failure to have an endless tread type vehicle can be very costly in that the crops may get planted late or valuable moisture lost for failure to cultivate. An endless tread means that can be secured to the wheels of a resiliently tired draft vehicle, therefore, could provide the farmer with adequate draft equipment no matter what the weather and at a comparatively low cost. The only equipment necessary in addition to a rubber tired vehicle would be my detachable tread means.

Some detachable treads of the type to which I refer have been made that use a cast tread pad. Such units are very satisfactory, but have certain drawbacks as well. For one thing, cast pads are cumbersome and unless made from some light metal are very heavy. Most of the light metal are rather soft also which means that pads cast from them tend to wear relatively rapidly. The light metals are also relatively expensive, of course, which gives them an added undesirable characteristic commercially speaking. Most castings are also relatively brittle although a cast steel is now available which has this characteristic to a minimum degree. Such castings are still expensive, however, and would cause treads made with cast steel pads to be rather costly.

Of the endless treads known to me that are provided with means for tightening the treads after they are assembled on the wheels of the vehicle, all provide a tightening means that increases the tension on both sides of one tread simultaneously. This fact requires considerably more leverage than would be necessary to tighten one side at a time. Also, of course, any unbalance or unequal pull on the tightening mechanism will cause one side of the tread to be drawn up more than the other. If one side is tightened more than the other, the tread will be warped or crooked and will not track well. The result will be either an unnecessarily rapid and unequal wearing of the tires over which it is mounted or a tendency for the tread to "walk" up the side of the tire. Independent means for tightening the two sides of one tread eliminates this difficulty.

Most crawling type tractors also are provided with large deep lugs extending across the face of the pad transversely of the length of the tread. These lugs are extremely damaging to hard surfaced roads. It is very difficult, if not impossible, to protect roadways from these lugs which means that the usual endless tread is not useable on or adaptable for use on hard surfaced roads. They must be transported about from place to place on trucks or trailers, therefore, that roll on rubber tires. My new tread is capable of being adapted for use on hard surfaced roads.

Another common failing of endless tread vehicles is their tendency to slip sideways on sloping, soft or wet earth and on low friction materials such as ice or the like. The reason why the usual endless tread vehicle slips side ways with ease is that the pads have little or no surface thereon to resist side ways movement. The lugs or cleats on the pads extend straight transversely of the treads. The pads, therefore, have almost no traction sidewise. A usual crawling or endless tread vehicle is practically helpless on ice or other very slippery surface particularly if the surface is sloping.

In view of the foregoing, it is the principal object of my invention to provide an endless tread having tough, light, inexpensive treads that can be rapidly fabricated.

It is a further object of my invention to provide an endless tread that is quickly and easily mounted on and removed from a resiliently tired vehicle to convert it from a wheeled vehicle to a crawling type or vice versa.

It is a further object of my invention to provide an endless tread, the two sides of which may be tightened around the wheels of a vehicle independently.

It is a further object of my invention to provide an endless tread that combines two different metals in the pad to take advantage of the best qualities of each.

It is a further object of my invention to provide an endless tread that has pads that are readily replaceable as independent units.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a side view of my endless tread secured around the resiliently tired wheels of a vehicle of which only a fragment is shown, Fig. 2 is an enlarged view of the inside of my tread showing the two end pads and one common or ordinary pad taken on the line 2—2 of Fig. 1; a portion of an end block is broken away to illustrate its construction, Fig. 3 is an enlarged longitudinal sectional view of one of the tightening devices on my tread and taken on the line 3—3 of Fig. 2, Fig. 4 is an enlarged cross sectional view of my tightening device illustrating how the cables are wound on the tightening drums and taken on the line 4—4 of Fig. 3, Fig. 5 is an enlarged outside or bottom perspective view of one of the pad tread members, Fig. 6 is an enlarged perspective view of one of the tread side blocks, Fig. 7 is an enlarged cross sectional view of a single pad member taken on the line 7—7 of Fig. 2, Fig. 8 is an enlarged longitudinal sectional view of an anchor pad taken on the line 8—8 of Fig. 2, Fig. 9 is an enlarged cross sectional view of a pad tread side block secured to a fragment of a pad and taken on the line 9—9 of Fig. 2. A fragmentary showing of an ordinary tire in cross sectional silhouette is shown with broken lines, and Fig. 10 is an enlarged bottom view of my modified angle edged and lugged pad plate.

Referring to the drawings, I have used the numeral 11 to designate an automotive vehicle having wheels 12 on which are mounted ordinary pneumatic tires 14. My endless tread is shown in Fig. 1 reeved over the tires 14. The tread is made up of a plurality of like pads of my new construction hereinafter referred to simply as common or ordinary pads and two special end pads each of which supports a portion of the tightening device. All of the pads are mounted on two flexible elements such as the cables 16 or the like. The common pads are made up of the substantially rectangular pad tread plate 18 and the four pad side blocks 20. The side blocks are secured to the plate in any suitable manner as by the rivets 22 extending through the blocks and appropriate holes 24 in the slanting side portion 26 of tread plate 18. The side blocks are in the general shape of a truncated wedge having a rectangular depression 28 in the upturned portion shown in Fig. 6. A hole 30 extends through the block to receive rivet 22 and a groove or channel 32 is formed in the lower portion of the block to receive cable 16. I have caused the groove 32 to intersect the margin of hole 30 as shown in Fig. 9 so that cable 16 is frictionally held in relation to the block by the rivet. The side blocks, therefore, hold the pad plates on the cables and also serve as tire tread side engaging members to hold the tread on the tire 14 as shown in Fig. 9.

The pad plate 18 has a central bend 34 in it to add to its lateral rigidity and also to cause the pads to conform to the shape of the wheels 14 as they pass over the wheels. Each edge of the plate 18 is bent to form a cleat or lug 36 that grips in soft surfaces. The bending downward of the lugs also makes the plate rigid laterally together with central bend 34. As pad plate 18 is stamped from sheet stock that has a raised pattern on it, this pattern appears on the bottom of the plate as cross welts 38. The modified form of pad plate designated 15 shown in Fig. 10 is like the pad plate 18, except that plate 15 is formed in the shape of a truncated triangle. The ends of the plate are slanted, therefore, and when bent down as the edges of plate 18, form the biased lugs 17. The lugs 17 are identical to the lugs 36 except that they are formed on the bias. Between each two plates and on each cable are spacer spools; and since they are all alike, they are all designated by the single numeral 40.

My early experiments with my endless tread were made with the cables bare between the pads. My experience has been that the cables soon break when they are uncovered between the pads. At first I thought the breakage resulted from a pulling force as the tread was subject to tensile strain when doing heavy work. Later I discovered that the breakage was the result of compression forces exerted on one cable in each tread as the vehicle was turned for example. By placing the spacer spools between the pads, the plates could not be forced closer together than the spacer spools would permit which minimized compression forces on the cables and prevented the breakage experienced with the free cables. These spacer spools also insure against the pads slipping along the cables and bunching at one place on the cables 16. While I have shown spools as the preferred form of unit, obviously, any suitable spacers could be used. Because the lugs 36 are rather shallow, and because central bend 34 carries the center of the plate near to the bottoms of lugs 36; a relatively thin piece of resilient material riveted or otherwise secured between lugs 36 to the bottom of the plate will lift the lugs off the surface over which the tread is used. Thus my endless tread pads are quickly adapted for use on hard surface roads.

The two ends of the tread terminate in special end plates. One of these I have designated 42 and call an anchor plate. The other end plate I call the winch or windless plate and designate with the numeral 44. The anchor plate has an ordinary or common pad side block on both ends of one side of the plate as is shown in Fig. 2. The plate itself is the same as pad plate 18 except that three holes are provided in each upturned end. The center hole at each side of the anchor plate receives cable gripping blocks 46 which are secured to the plate 42 in any suitable manner as by bolt 48 or the like. There is a passageway or opening 50 in each of the blocks 46 as shown in Fig. 8. Cable 16 is inserted through this opening and secured therein by any suitable means such as the Allen head set screw 52. In about the same position on plate 42 that the other side blocks would normally be secured is an anchor post. It consists of a rivet or equivalent 54 with a spacer 56 around its shank to hold washer 58 away from the plate end as is clearly shown in Fig. 8, right hand side.

The other end plate which I call the winch or windless plate has cable end blocks 60 secured to it in place of regular side blocks. These cable end blocks have tapered bores therein designated 62. The ends of cable 16 that are not secured in cable gripping blocks 46 are inserted through the bores 62 in cable end blocks 60 and are then spread or frayed slightly. The frayed ends are inserted into a container filled with melted lead which fills all the spaces between the cable wires and adheres thereto. The leaded cable ends are then drawn into the tapered bore 62 until they wedge there, thus holding the ends of the cable securely in the blocks. The blocks themselves are secured to the plate 44 by any suitable means such as the rivets 64 or the like.

Winch plate 44, also carries a pair of winches or tightening devices one for each side of the tread. These tightening mechanisms consist of a gear wheel 66 having beveled sides on its teeth. The gear has a drum 68 formed integrally with it and is pierced by a central bore 70. A stub shaft 72 extends through a suitable hole in the plate 44 and the bore 70. A shoulder 74 prevents the shaft from passing through the plate, and square head 76 provides a means for gripping the shaft to cause it to rotate. A short cable 78 is formed into a loop and the two free ends inserted through appropriate shaped bores 80 and 82 in the drum and stub shaft respectively. An Allen head set screw 84 or its equivalent places sufficient tension on the cables to hold them in the bores. As the cable 78 is tightened on the winch drum, the friction of the cable also tends to hold the cable on the drum. To prevent the winch from loosening once the tread is correctly adjusted, the dogs 86 are pivotally mounted near the gear wheels by rivets 88 or equivalent. Because the winches are arranged on the upturned end of the pad plate, it is necessary to bevel either the sides of the gear teeth or the ends of dogs 86. As the preferred form I have shown the gear teeth beveled. This bevel is at the same angle as the angle formed by the end and the base of the plate. The dog may be made square on its end when the gear teeth sides are slanted as shown and taught.

The use of my tread is practically self-evident. After arranging the tread over the wheels, the loops of cables 78 are hooked over the anchor post that corresponds to a given winch. Any suitable tool is used to turn square head 76 causing the stub shaft to rotate. The ends of the cable being gripped in the bore 82 are carried around thus drawing the loops up shorter and shorter to tighten the tread over the tires. When the tread is tight, dog 86 is forced into the appropriate gear tooth and pressure on the stub shaft square head 76 may be released. The gear bears on the dog and is held stationary. As cable 78 is passed through both the drum and the shaft, it acts as a pin therethrough to prevent either from turning independently of the other; holding the gear against rotation also secures the shaft. Dog 86 is not spring loaded as is common for this sort of a dog, but is rather tight on its rivet 88. A certain amount of effort is required both to engage and disengage the dog, therefore, which insures a positive holding of the wheel. To remove the tread, pressure is released from the dog by tightening the cable slightly so that the dog can be swung to the position shown in broken lines in Fig. 2. With the dog out of the way, cable 78 is unwound to release the tread. It will be appreciated, therefore, that I have invented a tread that is readily assembled or removed from the tractor or like.

Since my pads are stamped from relatively inexpensive steel sheet, they are tough, light and rapidly fabricated. The end blocks are cast and may be made from one of the light soft metals. They do not contact the ground or like and hence no problem of wear presents itself. Also because the side blocks are small, the cost involved is not prohibitive and the problem of having enough space for the castings to cool is minimized. At the same time, the total weight of the pads is held down making the unit relatively light.

While I have shown and taught the pad side blocks as being cast and preferably of a light metal, it is possible to cast them from iron or steel or even to stamp them from material similar to that used for the pad plates. When the pad treads shown in Fig. 10 are used, the vehicle equipped with my endless tread has considerable resistance to side slippage. These pads are preferably formed as truncated isosceles triangles so that any pad may be placed at any point along the tread. The slanting sides of the pads cause the lugs to be formed on the bias with respect to the tread as the sides are bent down. These slanting lugs act like skate blades turned sideward to resist sideward sliding movement of the tread and also of the machine, therefore. I have found that the angle of these lugs need be only mild and that a severe angle to these lugs causes the vehicle equipped with them to have an alternate back and forth snaking action as it moves over normal ground. In very hilly or cold country, however, the angle may necessarily be greater and the snaking or wobbling action will be a necessary evil.

Some changes may be made in the construction and arrangement of my endless tread without departing from the real spirit and purpose of my invention, and it is my intention to cover by my claims, any modified forms of structure or use of mechanical equivalents which may be reasonably included within their scope.

I claim:

1. In an endless tread, two elongated flexible elements arranged parallel to each other, a plurality of common pad elements secured transversely to said flexible elements in spaced relationship to each other; the ends of said flexible elements extending in pairs for a distance beyond the last common pad at each end of said flexible elements, an anchor plate rigidly secured to one pair of the free cable ends, a winch plate secured to the other pair of free cable ends, at least one winch on said winch plate, and flexible means anchored to said anchor plate and secured to said winch; whereby said anchor plate and winch plate may be drawn together.

2. In an endless tread, two elongated flexible elements arranged parallel to each other, a plurality of common pad elements secured transversely to said flexible elements in spaced relationship to each other; the ends of said flexible elements extending in pairs for a distance beyond the last common pad at each end of said flexible elements, an anchor plate rigidly secured to one pair of the free cable ends, a winch plate secured to the other pair of free cable ends, at least one winch on said winch plate, means for preventing the rotation of said winch in one direction, means for rendering said last mentioned means ineffective at times and flexible means anchored to said anchor plate and secured to said winch; whereby said anchor plate and winch plate may be drawn together.

3. In a winch for tightening a flexible element of an endless tread winch plate, a stub shaft adapted to being rotatably mounted in a circular journal, a shoulder on said stub shaft to limit its movement in one direction through a circular journal, a wrench receiving head portion beyond said shoulder and on said stub shaft; said stub shaft having a transverse opening therein, a drum having a hole therein adapted to slidably embracing a portion of said stub shaft; said drum having an opening therein adapted to being aligned with the opening in said stub shaft; the openings in said drum and stub shaft adapted to receive a flexible element, means for securing a flexible element in said openings, and means for preventing rotation of said drum in one direction, means for rendering said last mentioned means ineffective at times.

CHESTER I. LEVEKE.

References Cited in the file of this patent

UNITED STATES PATENTS

| Number | Name | Date |
|---|---|---|
| 1,195,640 | Baruch | Aug. 22, 1916 |
| 1,308,153 | Wheat | July 1, 1919 |
| 1,913,280 | Kennedy | June 6, 1933 |
| 2,133,653 | Bomford et al. | Oct. 18, 1938 |

FOREIGN PATENTS

| Number | Country | Date |
|---|---|---|
| 862,778 | France | Dec. 16, 1940 |